United States Patent [19]

Shimomura

[11] Patent Number: 4,489,806
[45] Date of Patent: Dec. 25, 1984

[54] DEVICE FOR RAISING AND LOWERING AN AIRFOIL

[75] Inventor: Masuo Shimomura, Nagoya, Japan

[73] Assignee: Aisin Seiki Kabushiki Kaisha, Kariya, Japan

[21] Appl. No.: 489,148

[22] Filed: Apr. 27, 1983

[30] Foreign Application Priority Data

May 6, 1982 [JP] Japan .................................. 57-75757

[51] Int. Cl.³ .............................................. B62D 37/00
[52] U.S. Cl. ..................................... 180/903; 296/1 S
[58] Field of Search ............... 180/903, 175, 176, 177; 296/1 S, 91; 244/766, 203, 214

[56] References Cited

U.S. PATENT DOCUMENTS

| 2,448,167 | 8/1948 | Baak | 244/203 |
|---|---|---|---|
| 3,455,594 | 7/1979 | Hall et al. | 296/1 S |
| 3,618,998 | 11/1971 | Swauger | 296/1 S |
| 4,102,548 | 7/1978 | Kangas | 296/1 S |
| 4,105,088 | 8/1978 | Leuijoki | 180/177 |
| 4,119,339 | 10/1978 | Heimburger | 180/903 |
| 4,131,308 | 12/1978 | Holka et al. | 296/1 S |
| 4,159,140 | 6/1979 | Chabot et al. | 296/1 S |
| 4,232,757 | 11/1980 | Ochiai et al. | 180/176 |

Primary Examiner—Joseph F. Peters, Jr.
Assistant Examiner—Donn McGiehan
Attorney, Agent, or Firm—Finnegan, Henderson, Farabow, Garrett & Dunner

[57] ABSTRACT

A device for raising and lowering an airfoil mounted on a lower portion of a vehicle body comprises a driving mechanism for driving the airfoil upwardly and downwardly, an electric device such as a motor for actuating the driving mechanism, a vehicle height detector for detecting the height of the vehicle body with respect to an axle, an airfoil height detector for detecting the height of the airfoil with respect to the vehicle body, and a control unit responsive to the vehicle height as detected by the vehicle height detector, the airfoil height as detected by the airfoil height detector, and the speed of travel of the vehicle body for actuating the electric device to lower the airfoil when the speed exceeds a predetermined level and the vehicle height is high.

5 Claims, 5 Drawing Figures

DEVICE FOR RAISING AND LOWERING AN AIRFOIL

BACKGROUND OF THE INVENTION

The present invention relates to an airfoil stabilizer attached to a vehicle for improving the aerodynamics thereof, and more particularly to an airfoil controller mounted on a lower portion of a vehicle for lowering an airfoil when the vehicle is running at high speeds and lifting the airfoil when the vehicle is running at low speeds.

It is known to attach an airfoil to a lower front portion of a vehicle for improving the aerodynamic properties of the vehicle, the airfoil being either fixed or movable up and down. One prior airfoil controller with a movable airfoil automatically controls the airfoil to move downwardly at high vehicle speeds and upwardly at lower vehicle speeds. The automatic airfoil controller is disadvantageous in that the airfoil as mounted on a vehicle having a reduced height tends to interfere with the road surface when the airfoil is lowered.

SUMMARY OF THE INVENTION

It is an object of the present invention to provide an airfoil controller for preventing an airfoil from interfering with the road surface.

Another object of the present invention is to provide an airfoil controller for controlling the angular disposition or height of an airfoil dependent on vehicle speeds while preventing the airfoil from interfering with the road surface.

According to the present invention, an airfoil is supported on a driving mechanism including an externally threaded rod held in threaded engagement with a nut mounted on a support arm connected to the airfoil. The externally threaded rod is actuated by a motor which is energized by a motor driver controlled by an electric control unit. A vehicle height detector is mounted on a vehicle body to which the airfoil is pivotably attached for detecting the vehicle height with respect to an axle. An airfoil height detector is coupled with the driving mechanism for detecting the height of the airfoil with respect to the vehicle body. When the vehicle speed is above a predetermined level and the vehicle height is high, the electric control unit actuates the motor to lower the airfoil. As long as the vehicle height is low, the airfoil is not lowered even when the vehicle speed exceeds the predetermined level since it is not necessary move down the airfoil at low vehicle speeds, thereby avoiding interference between the airfoil and the road surface. According to a preferred embodiment, the airfoil is lifted when the vehicle speed is lower than the predetermined level. According to another preferred embodiment, the airfoil is lifted when the vehicle height is low. When the brake pedal is depressed, the airfoil is raised to provide against a large bump on or a deep recess in the road.

The above and other objects, features and advantages of the present invention will become more apparent from the following description when taken in conjunction with the accompanying drawings in which preferred embodiments of the present invention are shown by way of illustrative example.

DESCRIPTION OF THE PREFERRED EMBODIMENTS

Figure 1:
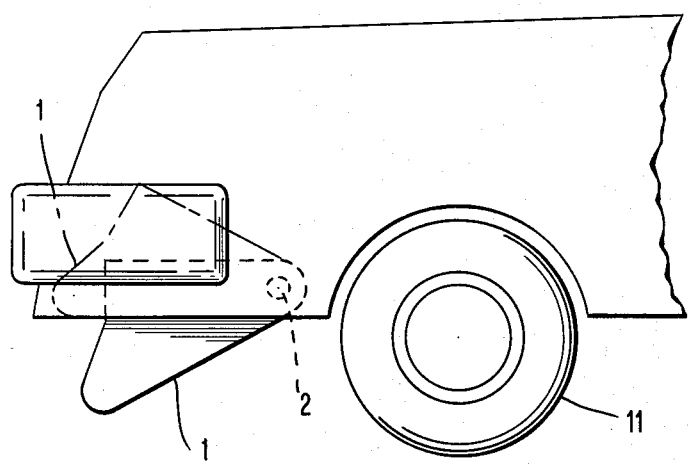
FIG. 1 is a fragmentary side elevational view of a vehicle to which an airfoil is attached.
Figure 2:
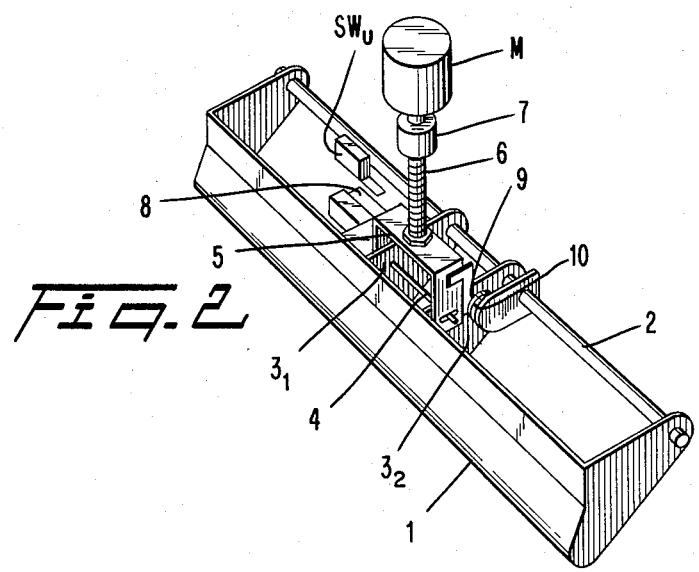
FIG. 2 is a perspective view of a mechanism for lifting and lowering the airfoil according to the present invention.

As shown in FIGS. 1 and 2, an airfoil 1 is pivotably mounted on a support rod 2 attached at ends to a vehicle body at a front end thereof, the airfoil 1 being angularly movable about the support rod 2. The airfoil 1 has a pair of integral arms $3_1$, $3_2$ to which a connecting rod 4 is fixed. The connecting rod 4 is engaged by a support arm 5 having a nut secured thereto. An externally threaded rod 6 extends threadedly through the nut on the support arm 5 and has a flange 7 rotatably suported on the vehicle body. The externally threaded rod 6 is coupled with a motor M above the flange 7. A switch actuator 8 is affixed to the arm 5. A link 9 is coupled to the support arm 5 and to a potentiometer 10 secured to the support rod 2.

When the motor M rotates in a normal direction, the support arm 5 is moved to raise the airfoil 1 and to rotate a shaft of the potentiometer 10 in a normal direction. When the airfoil 1 reaches a retracted position as shown by the two-dot-and-dash line in FIG. 1, the switch actuator 8 opens a normally-closed limit switch SWu. As the motor M rotates in a reverse direction, the airfoil 1 is lowered through the support arm 5, and the shaft of the potentiometer 10 rotates in a reverse direction. Upon arrival of the airfoil 1 at a lower limit position as shown by the solid line in FIG. 1, a normally-closed limit switch SWd (FIG. 4) is opened by the switch actuator 8.

Figure 3:
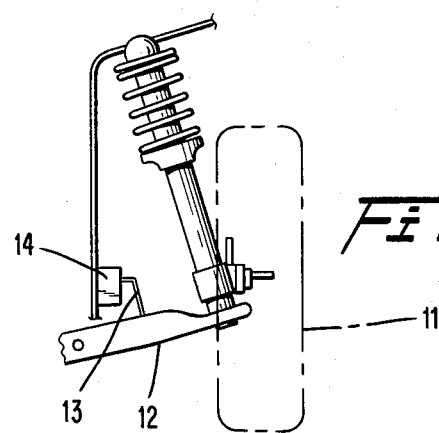
FIG. 3 is a fragmentary front elevational view of a car height detector as mounted on a vehicle.

As illustrated in FIG. 3, a link 13 has one end coupled to an axle support arm 12 of a syspension system for a front wheel 11. The other end of the link 13 is connected to a shaft of a potentiometer 14 affixed to the vehicle body, the potentiometer 14 serving as a vehicle height detector. When the vehicle body is lowered, the suspension system is contracted, and when the vehicle body is raised, the suspension system is expanded. The shaft of the potentiometer 14 is rotated dependent on such contracting and expanding movement of the suspension system.

Figure 4:
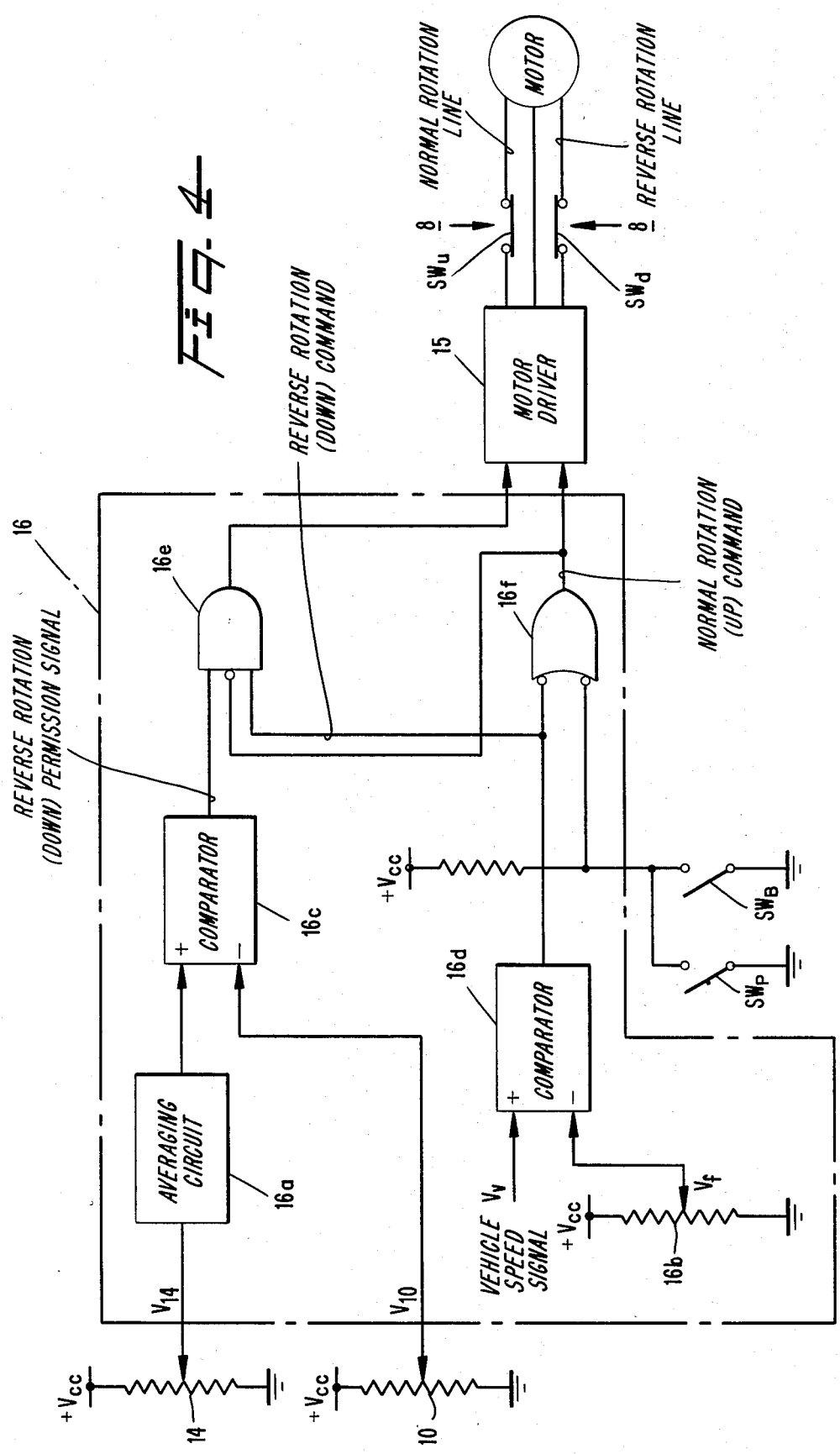
FIG. 4 is a block diagram of an electric control unit for controlling the mechanism shown in FIG. 2.

As shown in FIG. 4, the motor M is energized by a motor driver 15 through the limit switches SWu, SWd. An electric control unit 16 supplies the motor driver 15 with a reversal rotation signal of a high level "1" for rotating the motor M in a reverse direction to lower the airfoil 1 and a normal rotation signal of a high level "1" for rotating the motor M in a normal direction to lift the airfoil 1. As long as the reverse rotation signal "1" is applied, the motor driver 15 applies a reverse rotation voltage to a reverse rotation line connected to the motor M. Conversely, when the normal rotation signal "1" is applied, the motor driver 15 applies a normal rotation voltage to a normal rotation line connected to the motor M.

The electric control unit 16 comprises an averaging circuit 16a, a reference resistor 16b, comparators 16c, 16d, an AND gate 16e, and an OR gate 16f. An output from the potentiometer 14, high level when the vehicle height is high and low level when the vehicle height is low, is applied to the averaging circuit 16a, which then issues a vehicle height signal with vibrations of small periods being suppressed to a positive input terminal of the comparator 16c. A voltage from the potentiometer 10 serving as an airfoil height detector is applied to a negative input terminal of the comparator 16c, the voltage from the potentiometer 10 being of a high level when the airfoil height is high and of a low level when teh airfoil height is low. The comparator 16c has hysteresis such that when the voltage $V_{14}$ from the potentiometer 14 is higher than the voltage $V_{10}$, the comparator 16c applies a signal of a high level "1" to an input of the AND gate 16e and continues to apply such a high-level signal until $V_{14} < V_{10} - \Delta V_1$. When $V_{14} < V_{10} - \Delta V_1$, the comparator 16c produces an output of a low level "0". When $V_{14} > V_{10}$ while the comparator 16c is producing the output of level "0", the comparator 16c generates the output of level "1" again. Another input of the AND gate 16e is supplied with an output from the comparator 16d having similar hysteresis. The comparator 16d serves to compare a vehicle speed signal Vv (which is an analog voltage of a high level at high vehicle speeds and of a low level at low vehicle speeds) with a reference voltage Vf set by the resistor 16b. When Vv>Vf while the output from the comparator 16d is low, the comparator 16d produces an output of a high level "1". When $Vv < Vf - \Delta V_2$ while the output from the comparator 16d is high, the comparator 16d produces an output of a low level "0". The output from the comparator 16d is applied to the AND gate 16e and also to the OR gate 16f after it has been inverted. An inverting input terminal of the OR gate 16f is connected to a brake switch $SW_B$ which is closed when a brake pedal is depressed and an airfoil lifting switch $SW_P$ which is closed by a driver.

The airfoil 1 is driven to move upwardly and downwardly and positioned as shown in Table 1 dependent on vehicle speeds, heights, and turning on and off of the switches $SW_P$, $SW_B$.

TABLE 1

| Motor energized | | Output | | | | Motor de-energized | Airfoil | |
|---|---|---|---|---|---|---|---|---|
| Started | When | 16d | 16c | 16e | 16f | | Up/down | Stopped |
| Vv>Vf, $V_{14}>V_{10}$ | At high speeds, at high vehicle heights | 1 | 1 | 1 | 0 | $Vv<Vf - \Delta V_2$ or $V_{14}<V_{10} - \Delta V_1$ or SWd opened | Down | In unspecified position or a position corresponding to vehicle height or a lower limit position |
| $SW_P$ or $SW_B$ closed | to be retracted by interruption | — | — | 0 | 1 | $SW_P$ and $SW_B$ opened or SWu closed | Up | In unspecified positon or retracted position |
| Vv<Vf | At low speeds | 0 | — | 0 | 1 | Vv>Vf or SWu opened | Up | In unspecified position or retracted position |

When the vehicle runs at high speeds (Vv > Vf), the air foil 1 is lowered to the lower limit position as long as the vehicle height is large, but is stopped in a position higher than the lower limit position and determined by the vehicle height as long as the vehicle height is small. When the airfoil 1 reaches its lower limit position, the limit switch SWd is opened by the switch actuator SWd, cutting off the reverse rotation line to stop the reverse rotation of the motor M. When either the switch $SW_B$ or $SW_P$ is closed, or Vv<Vf, the AND gate 16e is opened to produce an output "0", and the OR gate 16f produces an output "1" commanding the normal rotation of the motor. The upward movement of the airfoil 1 is arrested at the time when Vv>Vf or both the switches $SW_B$, $SW_P$ are opened. When the airfoil 1 arrives at the retracted position, the switch actuator 8 opens the switch SWu stopping the normal rotation of the motor M. With the switch $SW_P$ being normally closed, the airfoil 1 remains located in the retracted position.

Figure 5:
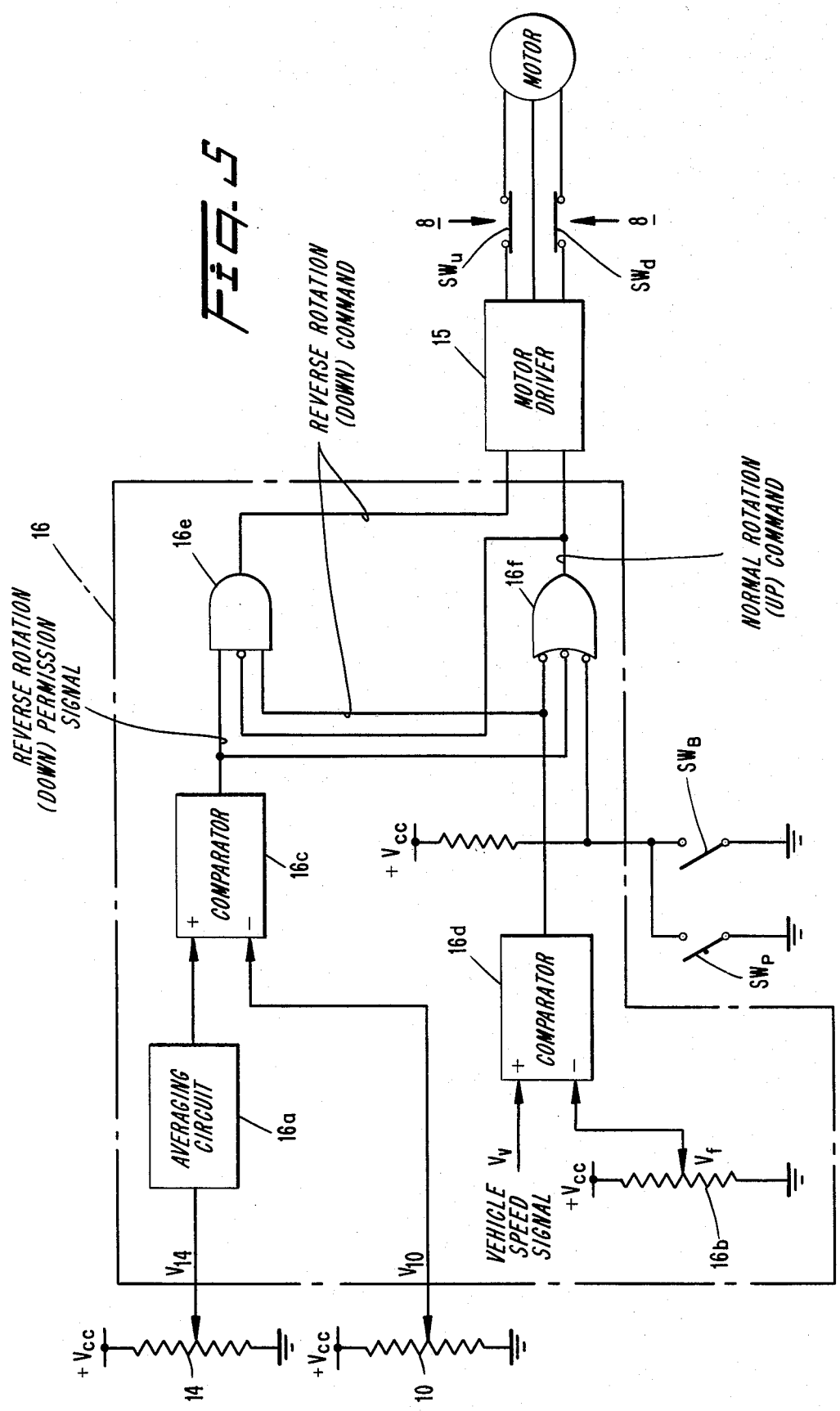
FIG. 5 is a block diagram of an electric control unit according to another embodiment of the present invention.

FIG. 5 shows an electric control unit 16 according to another embodiment of the present invention. In this circuit arrangement, a signal which is an inversion of an output from the comparator 16c applied to the OR gate 16f. As a result, the motor M is driven to rotate in a normal direction to lift the airfoil 1 when the latter is lower than the height corresponding to a vehicle height. The airfoil 1 is driven and stopped as shown in Table 2.

TABLE 2

| Motor energized | | Output | | | | Motor de-energized | Airfoil | |
|---|---|---|---|---|---|---|---|---|
| Started | When | 16d | 16c | 16e | 16f | | Up/down | Stopped |
| Vv>Vf, $V_{14}>V_{10}$ | At high speeds, at high vehicle heights | 1 | 1 | 1 | 0 | $Vv<Vf - \Delta V_2$ or $V_{14}<V_{10} - \Delta V_1$ or SWd opened | Down | In unspecified position or a position corresponding to vehicle height or a lower limit position |
| $SW_P$ or $SW_B$ closed | to be retracted by | — | — | 0 | 1 | $SW_P$ and $SW_B$ opened or SWu closed | Up | In unspecified position or retracted posi- |

TABLE 2-continued

| Motor energized | | Output | | | | | Airfoil | |
| --- | --- | --- | --- | --- | --- | --- | --- | --- |
| Started | When | 16d | 16c | 16e | 16f | Motor de-energized | Up/down | Stopped |
| | interruption | | | | | | | tion |
| $V_v < V_f$ | At low speeds | 0 | — | 0 | 1 | $V_v > V_f$ or SWu opened | Up | In unspecified position or retracted position |
| $V_{10} < V_{14}$ | Airfoil is low | — | 0 | 0 | 1 | $V_{10} < V_{14}$ or SWu opened | Up | In unspecified position or retracted position |

With the foregoing embodiments of the present invention, the airfoil 1 is located in the upper retracted position when the vehicle speed is lower than a predetermined level, and is lowered to a height allowed by the vehicle height when the vehicle speed exceeds the predetermined level. The vehicle speed is increased and then reduced under normal conditions, and the airfoil 1 is always kept in the retracted position until the vehicle speed becomes high. At high vehicle speeds, the airfoil 1 is moved downwardly to an allowed position corresponding to the vehicle height. As the vehicle decelerates, the airfoil 1 is returned back to the retracted position. Accordingly, the airfoil 1 is free from any danger of interfering with the road surface.

Although certain preferred embodiments have been shown and described, it should be understood that many changes and modifications may be made therein without departing from the scope of the appended claims.

What is claimed is:

1. A device for raising and lowering an airfoil mounted on a lower portion of a vehicle body, comprising:
   (a) a driving mechanism for driving the airfoil upwardly and downwardly;
   (b) an electric device for actuating said driving mechanism;
   (c) a vehicle height detector for detecting the height of the vehicle body with respect to an axle;
   (d) an airfoil height detector for detecting the height of the airfoil with respect to the vehicle body; and
   (e) a control unit responsive to the vehicle height as detected by said vehicle height detector, the airfoil height as detected by said airfoil height detector, and the speed of travel of the vehicle body for actuating said electric device to lower the airfoil when said speed exceeds a predetermined level and the vehicle height is high.

2. A device according to claim 1, wherein said control unit actuates said electric device to raise the airfoil when said speed is lower than said predetermined level.

3. A device according to claim 1, wherein said control unit actuates said electric device to raise the airfoil when said vehicle height is low.

4. A device according to claim 1, wherein said control unit actuates said electric device to raise the airfoil when said speed is lower than said predetermined level and said vehicle height is low.

5. A device according to claim 1, wherein said control unit is responsive to a brake signal for actuating said electric device to raise the airfoil.

* * * * *